United States Patent Office 3,297,761
Patented Jan. 10, 1967

3,297,761
SALTS OF NUCLEAR CYCLOALKYL
AROMATIC AMINES
Louis Schmerling, Riverside, Ill., assignor to Universal Oil
Products Company, Des Plaines, Ill., a corporation of
Delaware
No Drawing. Filed Mar. 23, 1964, Ser. No. 354,107
5 Claims. (Cl. 260—579)

This application is a continuation-in-part of my co-pending application, Serial No. 258,167, filed February 13, 1963, now Patent No. 3,222,401, December 7, 1965.

This invention relates to salts of nuclearly substituted aromatic amines. More specifically, the invention is concerned with inorganic acid salts of aromatic amines containing an alkyl or cycloalkyl substituent on the aromatic ring.

It has now been discovered that mineral acid salts of aromatic amines which have been nuclearly alkylated with an alkyl or cycloalkyl alkylating agent will find a wide variety of uses in the chemical field. For example, the mineral acid salts of the nuclearly alkylated aromatic amine may be utilized for the purpose of lowering the surface tension of various liquids such as water, a relatively small amount of the acid salt yielding copious quantities of suds when admixed with water. This lowering of the surface tension of water makes the salt very useful as a wetting agent. It is also extremely useful inasmuch as a lesser amount of soap or detergent may be used when washing various objects.

It is therefore an object of this invention to provide novel surface-active compositions of matter comprising salts of nuclearly substituted aromatic amines.

Another object of this invention is to provide novel surface-active compositions of matter comprising mineral acid salts of nuclearly substituted aromatic amines which are used as surface-active compounds.

In a broad aspect one embodiment of this invention resides in a surface-active agent comprising a salt of a nuclearly substituted aromatic amine, said substituents being selected from the group consisting of alkyl and cycloalkyl radicals, said radicals containing from 6 to about 12 carbon atoms.

Another embodiment of this invention is found in a surface-active agent comprising a salt of a nuclearly substituted aniline, said substituents being selected from the group consisting of alkyl and cycloalkyl radicals, said radicals containing from 6 to about 12 carbon atoms.

A specific embodiment of this invention is p-cyclooctyl-aniline hydrochloride.

Other objects and embodiments will be found in the following further detailed description of this invention.

As hereinbefore set forth, the present invention is directed to novel compositions of matter comprising salts of nuclearly substituted aromatic amines in which the substituents comprise alkyl or cycloalkyl radicals, said alkyl and cycloalkyl radicals containing from 4 to about 16 carbon atoms or more, preferably from 6 to about 12 carbon atoms. The novel compounds may be prepared by condensing analkylatable aromatic amine with an alkylating agent comprising an unsaturated alicyclic or cyclic compound containing only carbon and hydrogen atoms at alkylating conditions to form the desired product. The alkylatable aromatic amines are aromatic amines which contain at least one hydrogen atom on a ring carbon atom in an ortho or para position to the amino group. Particularly useful aromatic amines which may be utilized include aniline, o-toluidine, m-toluidine, p-toluidine, 2,4-dimethylaniline, 2,5-dimethylaniline, 2,6-dimethylaniline, 2,4,6-trimethylaniline, o-ethylaniline, m-ethylaniline, p-ethylaniline, 2,4-diethylaniline, 2,5-diethylaniline, 2,6-diethylaniline, 1-naphthtylamine, 2-naphthyl-amine, 1-methyl-2-naphthylamine, 3-methyl-2-naphthyl-amine, 2-methyl-1-naphthylamine, 3-methyl-1-naphthyl-amine, 4-methyl-1-naphthylamine, o-phenylenediamine, m-phenylenediamine, p-phenylenediamine, 4-methyl-o-phenylenediamine, 4 - methyl - m - phenylenediamine, 4-ethyl-o-phenylenediamine, 4-ethyl-m-phenylenediamine, 2 - methyl - p - phenylenediamine, 2 - ethyl - p - phenyl-enediamine, 1,2,3 - triaminobenzene, 1,2,4 - triamino-benzene, etc. Suitable mineral acid salts of aromatic amines which may be used include aniline hydrochloride, aniline hydrobromide, aniline nitrate, aniline sulfate, aniline phosphate, o-toluidine hydrochloride, o - toluidine hydrobromide, a - toluidine nitrate, o - toluidine sulfate, o - toluidine phosphate, m - toluidine hydrochloride, m-toluidine hydrobromide, m-toluidine nitrate, m-toluidine sulfate, m-toluidine phosphate, p-toluidine hydrochloride, p-toluidine hydrobromide, p-toluidine nitrate, p-toluidine sulfate, p-toluidine phosphate, 2,4-dimethylaniline hydrochloride, 2,4-dimethyl-aniline hydrobromide, 2,4-dimethylaniline nitrate, 2,4-dimethylaniline sulfate, 2,4-dimethylaniline phosphate, o-ethylaniline hydrochloride, o-ethylaniline hydrobromide, o-ethylaniline nitrate, o-ethylaniline sulfate, o-ethyl-aniline phosphate, p-ethylaniline hydrochloride, p-ethyl-aniline hydrobromide, p-ethylaniline nitrate, p-ethyl-aniline sulfate, p-ethylaniline phosphate, 2,6-diethyl-aniline hydrochloride, 2,6-diethylaniline hydrobromide, 2,6-diethylaniline nitrate, 2,6-diethylaniline sulfate, 2,6-diethylaniline phosphate, 1-naphthylamine hydrochloride, 1-naphthylamine hydrobromide, 1-naphthylamine nitrate, 1-naphthylamine sulfate, 1-naphthylamine phosphate, 1-methyl-2-naphthylamine hydrochloride, 1-methyl-2-naphthylamine hydrobromide, 1-methyl-2-naphthylamine nitrate, 1-methyl-2-naphthylamine sulfate, 1-methyl-2-naphthylamine phosphate, 2-ethyl-1-naphthylamine hydrochloride, 2-ethyl-1-naphthylamine hydrobromide, 2-ethyl-1-naphthylamine nitrate, 2-ethyl-1-naphthylamine sulfate, 2-ethyl-1-naphthylamine phosphate, o-phenylene-diamine hydrochloride, o-phenylenediamine hydrobromide, o-phenylenediamine nitrate, o-phenylenediamine sulfate, o-phenylenediamine phosphate, 4-methyl-o-phen-ylenediamine hydrochloride, 4-methyl - o - phenylenedi-amine hydrobromide, 4-methyl-o-phenylenediamine nitrate, 4-methyl-o-phenylenediamine sulfate, 4-methyl-o-phenylenediamine phosphate, 2-methyl - m - phenylenedi-amine hydrochloride, 2-methyl-m-phenylenediamine hydrobromide, 2-methyl - m - phenylenediamine nitrate, 2-methyl-m-phenylenediamine sulfate, 2-methyl - m - phen-ylenediamine phosphate, 1,2,3 - triaminobenzene hydrochloride, 1,2,3-triaminobenzene hydrobromide, 1,2,3-tri-aminobenzene nitrate, 1,2,3-triaminobenzene sulfate, 1,2,3-triaminobenzene phosphate, etc. N-monoalkyl derivatives of the above mentioned compounds in which said alkyl groups contain from 1 to 12 carbon atoms may also be nuclearly alkylated by the process of this invention although not necessarily with equivalent results.

Suitable alkylating agents which may be used in the process of this invention comprise unsaturated hydrocarbons containing at least 4 carbon atoms and as many as 16 carbon atoms or more. Examples of these alkylating agents which contain only carbon and hydrogen atoms include 1-butene, 2-butene, 1-pentene, 2-pentene, 1-hex-ene, 2-hexene, 3-hexene, the isomeric heptenes, octenes, nonenes, decenes, undecenes, dodecenes, tridecenes, tetra-decenes, pentadecenes, hexadecenes, etc., both straight and branched chain in configuration, etc.; cyclopentene, cyclohexene, cycloheptene, cyclooctene, cyclononene, cyclo-decene, cycloundecene, cyclododecene, etc., methylcyclo-pentenes, methylcyclohexenes, methylcycloheptenes, 1-methylcyclooctene, 3-methylcyclooctene, 4-methylcyclo-octene, 5-methylcyclooctene, 1-ethylcyclooctene, 3-ethylcyclooctene, 4-ethylcyclooctene, 5-ethylcyclooctene, 1-propylcyclooctene, 3-propylcyclooctene, 4-propylcyclooctene, 5-propylcyclooctene, 1-isopropylcyclooctene, 3-isopropylcyclooctene, 4-isopropylcyclooctene, 1-methylcyclononene, 3-methylcyclononene, 4-methylcyclononene, 5-methylcyclononene, 6-methylcyclononene, 1-ethylcyclononene, 3-ethylcyclononene, 4-ethylcyclononene, 5-ethylcyclononene, 6-ethylcyclononene, 1-propylcyclononene, 3 - propylcyclononene, 4 - propylcyclononene, 1 - isopropylcyclononene, 3-isopropylcyclononene, 4-isopropylcyclononene, 1-methylcyclodecene, 3-methylcyclodecene, 4-methylcyclodecene, 5-methylcyclodecene, 6-methylcyclodecene, 1 - ethylcyclodecene, 3 - ethylcyclodecene, 4-ethylcyclodecene, 1-propylcyclodecene, 3-propylcyclodecene, 4-propylcyclodecene, 1-isopropylcyclodecene, 3-isopropylcyclodecene, 4-isopropylcyclodecene, 1,2-dimethylcyclooctene, 2,3 - dimethylcyclooctene, 2,3 - diethylcyclooctene, 2,4-dimethylcyclooctene, 2,4-diethylcyclooctene, 1,2-dimethylcyclononene, 2,3-dimethylcyclononene, 2,3-diethylcyclononene, 2,4-dimethylcyclononene, 2,4-diethylcyclononene, 1,2-dimethylcyclodecene, 2,3-diethylcyclodecene, 2,4-dimethylcyclodecene, 2,4-diethylcyclodecene, etc. In general, alkylating agents containing from 6 to about 12 carbon atoms are preferred. It is to be understood that the aforementioned aromatic amines and alkylating agents are only representatives of the class of compounds which may be used and that the process of the present invention is not necessarily limited thereto.

The alkylation of the aromatic amine or of the mineral salt thereof with the alkylating agent comprising an unsaturated hydrocarbon containing at least 4 carbon atoms is usually effected at elevated temperatures and pressures. The alkylation conditions which are utilized include a temperature within the range of from about 150° to about 350° C. or more. In addition, the reaction is effected at pressures ranging from about atmospheric to about 100 atmospheres or more, the preferred pressure being that which is sufficient to maintain at least a portion of the reactants in the liquid phase and which may be effected by the introduction of a substantially inert gas such as nitrogen into the reaction zone. In the event that an aromatic amine is alkylated, the reaction is also effected in the presence of a catalyst selected from the group consisting of Friedel-Crafts metal halides and hydrogen halides. Of the Friedel-Crafts metal halide catalysts, the preferred metal halides include zinc chloride, cuprous chloride, cupric chloride, etc. Other metal halides such as aluminum chloride, ferric chloride, etc. may also be used although not necessarily with equivalent results. Of the hydrogen halides, preferred species to be used include hydrogen chloride and hydrogen bromide.

The alkylation of the aromatic amine of the mineral acid salt thereof may be effected in any suitable manner and may comprise ether a batch or continuous type operation. For example, when a batch type operation is used, a quantity of the salt of the aromatic amine and the alkylating agent are placed in an appropriate apparatus provided with heating means and means for applying pressure thereto. Alternatively, if an aromatic amine is to be alkylated, a quantity of the amine, the alkylating agent and the catalyst comprising a Friedel-Crafts type metal halide, preferably one which may be termed a "mild Friedel-Crafts type catalyst" such as zinc chloride, are placed in a comparable apparatus. It is also contemplated within the scope of this invention that Friedel-Crafts type catalysts which are characterized as "strong" such as aluminum chloride, ferric chloride, aluminum bromide, etc. may also be used in stoichiometric amounts, although not necessarily with equivalent results. A particularly applicable apparatus in which to effect the batch type operation of the present process comprises a rotating autoclave. When such an apparatus is used, the aforementioned materials are placed in a glass liner thereof following which the autoclave is sealed and heated to the desired temperature. As hereinbefore set forth, if superatmospheric pressures are desired, an inert gas such as nitrogen is pressed in to effect said pressure. The autoclave and contents thereof are then heated to the desired operating temperature and maintained thereat for a predetermined residence time. Upon completion of the desired residence time, the autoclave and contents thereof are cooled to room temperature, the excess pressure vented and the autoclave is opened. The reaction product is then recovered and subjected to treatment by conventional means to recover the desired product. One example of such treatment is to wash the product with an organic solvent such as ether and subject the extract to fractional distillation under reduced pressure. It is also possible to treat the product with water followed by extraction with ether. The aqueous layer which is recovered is made basic with an alkaline substance, extracted with ether and the ether extract subjected to fractional distillation under reduced pressure. If the reaction product comprises an alkylated aromatic amine, the desired salt is prepared by treating the nuclearly substituted aromatic amine with the corresponding acid such as hydrochloric acid, hydrobromic acid, hydrofluoric acid, hydroiodic, sulfuric, nitric, phosphoric acid, etc. and the desired salt recovered.

It is also contemplated that the novel composition of matter comprising the salt of a nuclearly substituted aromatic amine may be prepared in a continuous manner of operation although not necessarily with equivalent results. When such a method is used, the starting product comprising the aromatic amine and the alkylating agent comprising an unsaturated hydrocarbon either alicyclic or cyclic in nature and containing at least 4 carbon atoms are continuously charged to a reaction zone which is maintained at the proper operating conditions of temperature and pressure. The Friedel-Crafts type catalyst of the type hereinbefore set forth may be placed in the reaction zone in a fixed bed while the starting materials are passed through said bed in either an upward or downward flow. As hereinbefore set forth, if the starting material comprises a salt of an aromatic amine such as the hydrochloride salt, hydrobromide salt, hydrofluoride salt, sulfate salt, nitrate salt, etc., the reaction is effected in the absence of any additional catalyst. Upon completion of the desired residence time, the reactor effluent is continuously withdrawn, separated from unreacted starting materials which may be recycled to form a portion of the feed stock, the desired effluent being subjected to treatment in a manner similar to that hereinbefore set forth whereby the desired product is separated and recovered.

The novel surface-active compositions of matter which are prepared according to the process hereinbefore set forth comprise salts, and preferably mineral acid salts, of nuclearly substituted aromatic amines selected from the group consisting of those compounds having the following generic formulae:

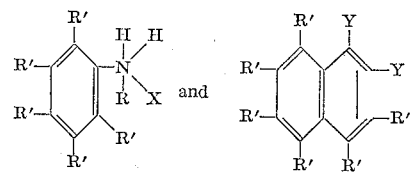

in which R is selected from the group consisting of hydrogen and alkyl radicals, R' is selected from the group consisting of hydrogen, alkyl and cycloalkyl radicals, said alkyl and cycloalkyl radicals containing from 4 to 12 carbon atoms, at least one R' being selected from the latter two members of the group, X is an inorganic anion, and Y is selected from the group consisting of R' and

radicals, at least one Y being an

radical. Examples of these compounds include o-butylaniline hydrochloride, m-butylaniline hydrochloride, p-butylaniline hydrochloride, o-pentylaniline hydrochloride, m-pentylaniline hydrochloride, p-pentylaniline hydrochloride, o-hexylaniline hydrochloride, m-hexylaniline hydrochloride, p-hexylaninline hydrochloride, o-heptylaniline hydrochloride, m-heptylaniline hydrochloride, p-heptylaniline hydrochloride, o-octylaniline hydrochloride, m-octylaniline hydrochloride, p-octylaniline hydrochloride, o-dodecylaniline hydrochloride, m-dodecylaniline hydrochloride, p-dodecylaniline hydrochloride, etc., 2-pentyl-p-toluidine hydrochloride, 2-hexyl-p-toluidine hydrochloride, 2 - heptylhydrochloride, 2 - octyl - p - toluidine hydrochloride, 4 - butyl - 1 - naphthylamine hydrochloride, 1 - butyl - 2 - naphthylamine hydrochloride, 4 - pentyl-1-naphthylamine hydrochloride, 1-pentyl-2-naphthylamine hydrochloride, 4-hexyl-1-naphthylamine hydrochloride, 1-hexyl-2-naphthylamine hydrochloride, 4-heptyl-1-naphthylamine hydrochloride, 1-heptyl-2-naphthylamine hydrochloride, 4-octyl-1-naphthylamine hydrochloride, 1-octyl-2-naphthylamine hydrochloride, o-cyclopentylaniline hydrochloride, m-cyclopentylaniline hydrochloride, p-cyclopentylaniline hydrochloride, o-cyclohexylaniline hyhyrochloride, m-cyclohexylaniline hydrochloride, p-cyclohexylaniline hydrochloride, o-cycloheptylaniline hydrochloride, m-cycloheptylaniline hydrochloride, p-cycloheptylaniline hydrochloride, o-cyclooctylaniline hydrochloride, m-cyclooctylaniline hydrochloride, p-cyclooctylaniline hydrochloride, o-cyclononylaniline hydrochloride, m-cyclononylaniline hydrochloride, p-cyclononylaniline hydrochloride, o-cyclodecylaniline hydrochloride, m-cyclodecylaniline hydrochloride, p-cyclodecylaniline hydrochloride, 2-cyclopentyl-p-toluidine hydrochloride, 2-cyclohexyl-p-toluidine hydrochloride, 2-cycloheptyl-p-toluidine hydrochloride, 2-cyclooctyl-p-toluidine hydrochloride, 2-cyclononyl-p-toluidine hydrochloride, 2-cyclodecyl-p-toluidine hydrochloride, 6-cyclopentyl-o-toluidine hydrochloride, 6-cyclohexyl-o-toluidine hydrochloride, 6-cycloheptyl-o-toluidine hydrochloride, 6-cyclooctyl-o-toluidine hydrochloride, 6-cyclononyl-o-toluidine hydrochloride, 6-cyclodecyl-o-toluidine hydrochloride, 4-cyclopentyl-o-toluidine hydrochloride, 4-cyclohexyl-o-toluidine hydrochloride, 4 - cycloheptyl - o - toluidine hydrochloride, 4-cyclooctyl - o - toluidine hydrochloride, 4-cyclononyl-o-toluidine hydrochloride, 4-cyclodecyl-o-toluidine hydrochloride, 4-cyclopentyl-1-naphthylamine hydrochloride, 4-cyclohexyl-1-naphthylamine hydrochloride, 4-cycloheptyl-1-naphthylamine hydrochloride, 4-cyclooctyl-1-naphthylamine hydrochloride, 4-cyclononyl-1-naphthylamine hydrochloride, 4-cyclodecyl-1-naphthylamine hydrochloride, 1-cyclopentyl-2-naphthylamine hydrochloride, 1-cyclohexyl-2-naphthylamine hydrochloride, 1-cycloheptyl-2-naphthylamine hydrochloride, 1 - cyclooctyl-2-naphthylamine hydrochloride, 1-cyclononyl-2-naphthylamine hydrochloride, 1-cyclodecyl-2-naphthylamine hydrochloride, etc., the corresponding hydrobromide, hydroiodide, hydrofluoride, sulfate, nitrate and phosphate salts. It is to be understood that the aforementioned products are only representative of the class of compounds which may be prepared and that the process of the present invention is not necessarily limited thereto.

The following examples are given to illustrate the process of the present invention which, however, are not intended to limit the generally broad scope of the present invention in strict accordance therewith.

*Example I*

Cycloalkylation of aniline was effected by placing 50 grams of aniline, 55 grams of cyclooctene and 20 grams of a catalyst comprising 25% zinc chloride on alumina pills in a glass liner of a rotating autoclave. The liner was sealed into the autoclave and nitrogen pressed in until an initial pressure of 30 atmospheres was reached. The autoslave and contents thereof were then heated to a temperature of about 150° C. and maintained in a range of from about 150° to about 250° C. for a period of 2.5 hours. During this time the maximum pressure rose to 75 atmospheres. Upon completion of the desired residence time, the autoclave and contents thereof were cooled to room temperature, the final pressure being 30 atmospheres. The excess pressure was vented, the autoclave opened and 125 grams of reaction product was recovered.

The product which comprised a mixture of dark amber liquid and fluocculent white solid was filtered and the solid was washed with several portions of ether. The combined filtrate and washings were then subjected to fractional distillation under reduced pressure. The cut boiling at 122°–123° C. at 0.6 mm. pressure was recovered. This cut had a refractive index $n_D^{20}$ of 1.5643. Basic nitrogen determination of the cut indicated that it had a molecular weight of 203.6 while the molecular weight calculated for cyclooctylaniline is 203.3. The cut was subjected to nuclear magnetic resonance and infrared analysis which indicated that 90% of this cut was o-cyclooctylaniline.

The hydrochloride salt of o-cyclooctylaniline is prepared by treating said aniline with hydrochloric acid and the desired salt recovered from the reaction mixture by conventional means. A drop of this salt when added to water containing a drop of concentrated hydrochloric acid will produce a copious quantity of suds upon shaking.

*Example II*

A mixture of 82 grams of aniline hydrobromide and 36 grams of cyclooctene was placed in the glass liner of a rotating autoclave. The liner was sealed into the autoclave and nitrogen pressed in until an initial pressure of 30 atmospheres was reached. The autoclave and contents thereof were then heated to a temperature of about 150° C. and maintained in a range of from about 150° C. to about 300° C. for a period of 4 hours, the maximum pressure during this time reaching 85 atmospheres. At the end of this time the autoclave and contents thereof were cooled to room temperature, the final pressure being 30 atmospheres. The excess pressure was vented, the autoclave opened and the reaction product comprising 106 grams, a mixture of amber liquid and crystals, was separated and recovered. The product was then treated with water containing a minor amount of hydrochloric acid to assure acidic conditions and extracted with ether. This resulted in three layers which were separated in a separatory funnel. The intermediate layer was made alkaline and extracted with ether. The ether extract was then subjected to fractional distillation under reduced pressure and the cut boiling at 116°–127° C. at 0.5 mm. pressure (320°–337° C. at 760 mm. pressure) having a refractive index $n_D^{20}$ of 1.5499 was recovered. Basic nitrogen determination of this cut indicated that it had a molecular weight of 200.8 while that calculated for cyclooctylaniline is 203.3. Nuclear magnetic resonance analysis of this cut indicated that it comprised about 85% p-cyclooctylaniline and 15% o-cyclooctylaniline. These cyclooctylanilines were, as was apparent from their nuclear magnetic resonance spectra, mixed with isomeric (dimethylcyclohexyl) anilines.

When the lowest layer (of the three layers mentioned above) was made alkaline and extracted with ether, there was liberated unreacted aniline. It seems apparent that the hydrochloride of the cyclooctylaniline is less soluble in water than is the hydrochloride of aniline and forms an intermediate layer which is ether insoluble. This permits the separation of aniline and its cyclooctyl derivatives by means other than distillation.

Addition of a drop of the cyclooctylaniline cut described above to a solution of a drop of concentrated hydrochloric acid in about 5 ml. of water produced a mixture which yielded copious suds on shaking. The surface tension of a 0.2% solution of the cut in water containing merely enough hydrochloric acid to give a slightly acidic solution was 40.0 dynes per cm. at 25° C.

*Example III*

Another experiment was performed in which lower reaction temperatures were used. In this example 164 grams of aniline hydrobromide and 75 grams of cyclooctene were placed in the glass liner of a rotating autoclave which was thereafter sealed into said autoclave. Nitrogen was pressed in until an initial pressure of 30 atmospheres was reached and the autoclave was heated to about 150° C. and maintained in a range of from about 150° to about 250° C. for a period of about 5.3 hours, the maximum pressure during this time reaching 68 atmospheres. Upon completion of the desired residence time, the autoclave and contents thereof were cooled to room temperature, the final pressure being 30 atmospheres. The excess pressure was vented, the autoclave was opened and 220 grams of product consisting of a mixture of amber liquid and crystals was recovered. The product was treated with water containing a small amount of hydrochloric acid and with ether. Two layers were obtained, a dark amber ether solution and a pale amber aqueous solution. When the ether solution was treated with anhydrous potassium carbonate to dry it, effervescence occurred. The extract was washed with water to separate an acidic aqueous solution which yielded an aniline derivative when made alkaline; fractional distillation gave a cut boiling at 121°–127° C. at 0.8 mm. pressure having a refractive index $n_D^{20}$ of 1.5500. This was shown by nuclear magnetic resonance and infrared analysis to consist chiefly of p-cyclooctylaniline mixed with lesser amounts of o-cyclooctylaniline and o- and p-(dimethylcyclohexyl)aniline. Addition of a drop of this material to a very dilute aqueous solution of hydrochloric acid gave a solution which yielded copious suds on shaking.

The original ether layer was then subjected to fractional distillation under reduced pressure and the cut boiling at 120°–130° C. at 1.0 mm. pressure (324°–334° C. at 760 mm. pressure) having a refractive index $n_D^{20}$ of 1.5400 was separated and recovered. Nuclear magnetic resonance and infrared analysis of this cut indicated that the majority of the cut comprised o-cyclooctylaniline with a small amount of p-cyclooctylaniline and (dimethylcyclohexyl)anilines present. This cut also yielded a sudsing solution when added to dilute hydrochloric acid, but the suds were less copious than were those obtained from the cut described in the preceding paragraph.

*Example IV*

Treating a mixture of 91 grams of aniline, 47 grams of cyclooctene and 20 grams of a 25% zinc chloride on alumina catalyst from 115° to 250° C. during 5.5 hours and working up the product by the procedures described in the above examples yielded material boiling largely at from 107° to 112° C. at 0.3–0.4 mm. pressure and having a refractive index $n_D^{21}$ of 1.550–1.551. Nuclear magnetic resonance and infrared analysis of this material indicated that the cut was chiefly a mixture of o- and p-cyclooctylaniline (in approximately equal amounts) together with some of the isomeric o- and p-(dimethylcyclohexyl)anilines.

The hydrochloride salt of the above identified compounds is prepared by treating the cut with hydrochloric acid and recovering the desired salt after separation from the unreacted acid. A small quantity of the salt will yield suds when added to water and thoroughly agitated.

*Example V*

In this example a mixture of 103 grams (1.11 moles) of aniline, 51 grams (0.46 mole) of cyclooctene and 10 grams of zinc chloride was treated in a manner similar to that set forth in the above examples, that is, by effecting the reaction at a temperature of from about 150° to about 250° C. for a period of 5.5 hours at an initial pressure of 35 atmospheres. The 35 atmospheres consist of 30 atmospheres of nitrogen plus 5 atmospheres of anhydrous hydrogen chloride which acted as a promoter. At the end of 5.5 hours the reaction product was recovered and also treated in a manner similar to that hereinbefore set forth. There was recovered 35 grams of cyclooctylaniline, the chief constituent being the o-isomer and, in addition, a crystalline material which melted at a temperature in the range of from about 95°–100° C., said material being the hydrochloride salt of o-cyclooctylaniline.

Addition of a small amount of the crystalline material obtained according to the above paragraph will greatly reduce the surface tension of water.

*Example VI*

A mixture of 102 grams (1.10 moles) of aniline, 50 grams of cyclooctene and 15 grams of cyclooctyl chloride along with 10 grams of zinc chloride was placed in the glass liner of a rotating autoclave and treated in a manner similar to that hereinbefore set forth. The temperature during the reaction was maintained in a range of from about 150° to about 250° C. at an initial pressure of 30 atmospheres of nitrogen. At the end of the reaction time the product was recovered and subjected to treatment in a manner similar to that set forth in the above examples. Fractional distillation of the residue resulted in the recovery of 26 grams of o-cyclooctylaniline having a refractive index $n_D^{20}$ of 1.5652. The o-cyclooctylaniline recovered in this experiment did not appear to be contaminated with (dimethylcyclohexyl)anilines.

The hydrobromide salt of o-cyclooctylaniline is prepared by treating the latter which has been prepared according to the above paragraph with hydrogen bromide and recovering the desired salt. This salt acts in a manner similar to the hydrochloride salt in that a small amount of said salt when added to water produces a copious quantity of suds upon agitation of the mixture.

*Example VII*

A mixture of 103 grams of aniline, 47 grams of cyclooctene and 10 grams of cuprous chloride catalyst was treated by placing the mixture in the glass liner of a rotating autoclave, sealing said glass liner into the autoclave, heating to a temperature of 150° C. and pressing in nitrogen until an initial pressure of 30 atmospheres was reached. The autoclave was maintained at a temperature of from about 150° to about 250° C. for 5 hours during which time the maximum pressure rose to 53 atmospheres. At the end of this time the autoclave and contents thereof were allowed to cool to room temperature, the final pressure being 30 atmospheres. The excess pressure was vented and the reaction product recovered. The product was worked up in a manner similar to that hereinbefore set forth and the ether extract subjected to fractional distillation under reduced pressure. There was recovered 28 grams of product having a refractive index $n_D^{20}$ of 1.5658, said product having a boiling point of 140° at 1.0 mm. pressure. Nuclear magnetic resonance analysis of this product indicated that the major component consisted of cyclooctylaniline with no appearance of (dimethylcyclohexyl)aniline.

A sulfate salt of the cyclooctylaniline is prepared by treating said cyclooctylaniline with dilute sulfuric acid and recovering the salt upon separation from the unreacted sulfuric acid. This salt also exhibits the property of lowering the surface tension of water when added thereto.

*Example VIII*

A mixture of 90 grams (0.97 mole) of aniline, 50 grams (0.45 mole) of cyclooctene and 10 grams of cupric chloride was placed in the glass liner of a rotating autoclave and treated in a manner smilar to that hereinbefore set forth. Upon completion of the desired residence time the product comprising a mixture of dark oil and a tarry solid was filtered and the solid was washed with ether. The ether washing and the liquid were combined and subjected to fractional distillation under reduced pressure. The cut boiling in the range of 134°–138° C. at 1.0 mm. pressure, having a refractive index $n_D^{20}$ of 1.5746 and consisting mainly of o-cyclooctylaniline was separated and recovered.

The nitrate salt of o-cyclooctylaniline, prepared by treating said substituted aniline with dilute nitric acid and separating the desired salt from unreacted nitric acid, acts in a manner similar to that hereinbefore set forth with the other mineral acid salts by lowering the surface tension of water when added to the water in a relatively small quantity compared to the amount of water present.

*Example IX*

A mixture of 105 grams (1.12 moles) of aniline, 50 grams (0.61 mole) of cyclohexene and 10 grams of zinc chloride was placed in the glass liner of a rotating autoclave. The autoclave was sealed and nitrogen pressed in until an initial pressure of 30 atmospheres was reached. In addition 5 atmospheres of anhydrous hydrogen chloride was also pressed in. The autoclave was maintained at a temperature of 150° to about 250° C. for a period of approximately 6 hours following which time the autoclave and contents thereof were allowed to cool to room temperature. During the reaction the maximum pressure rose to 50 atmospheres while the final pressure at room temperature was 25 atmospheres. The excess pressure was vented, the autoclave was opened and the reaction product was treated in a manner similar to that hereinbefore set forth in the above examples. Distillation of the alkalinized aqueous solution under reduced pressure yielded 15 grams of a cut boiling at 95°–97° C. at 0.6 mm. pressure having a refractive index $n_D^{21}$ of 1.5643. The basic nitrogen value of this cut corresponded to a molecular weight of 172.7 while that calculated for $C_6H_{11}C_6H_4NH_2$ is 175.3. The nuclear magnetic resonance analysis of this cut indicated that it contained a mixture of o-cyclohexylaniline and o-methylcyclopentylaniline together with a small amount of the p-isomers.

The hydrochloride salt of o-cyclohexylaniline and o-methylcyclopentylaniline is prepared by treating the mixture with hydrochloric acid and separating the desired salts in the unreacted acid. It possesses the desirable property of lowering the surface tension of water.

*Example X*

A solution of 94 grams of p-toluidine hydrobromide and 55 grams of cyclooctene is placed in the glass liner of a rotating autoclave which is thereafter sealed into said autoclave. Nitrogen is pressed in until an initial pressure of 30 atmospheres is reached following which the autoclave is heated to a temperature of about 150° C. The autoclave and contents thereof are maintained at a temperature in the range of from about 150° to about 250° C. for a period of about 5 hours. At the end of this time the autoclave and contents thereof are allowed to cool to room temperature, the excess pressure is vented and the reaction product recovered from the autoclave. The reaction product is treated in a manner similar to that set forth in the above examples and the desired product comprising the hydrochloride salt of 2-cyclooctyl-p-toluidine is separated and recovered. This salt also exhibits the ability to lower the surface tension of water.

*Example XI*

A mixture of 50 grams of aniline, 62 grams of 1-methylcyclooctene and 20 grams of zinc chloride catalyst such as that used in Example I is placed in the glass liner of a rotating autoclave which is thereafter sealed into said autoclave. Nitrogen is pressed in until an initial pressure of 30 atmospheres is reached and the autoclave is then heated to a temperature of about 150° C. The autoclave is maintained at a temperature in the range of from about 150° to about 250° C. for a period of 5 hours after which said autoclave and contents thereof are allowed to cool to room temperature, the excess pressure is vented and the reaction mixture is subjected to a treatment hereinbefore set forth in the above examples. The desired product comprising (methylcyclooctyl)-anilines is separated and recovered by fractional distillation under reduced pressure.

The hydrochloride salt of the (methylcyclooctyl)-anilines is prepared by subjecting said anilines to the action of hydrochloric acid and recovering the desired salt by separation from unreacted acid.

*Example XII*

A solution of 87 grams of p-toluidine hydrobromide and 62 grams of cyclononene is placed in the glass liner of a rotating autoclave. The liner is sealed into the autoclave, nitrogen is pressed in until an initial pressure of 30 atmospheres is reached and the autoclave is heated to a temperature of about 150° C. The autoclave and contents thereof are then maintained at a temperature in the range of from about 150° to about 250° C. for a period of about 4.5 hours. At the end of this time the autoclave and contents thereof are cooled to room temperature, the excess pressure is vented and the autoclave is opened and the reaction mixture containing the desired product is recovered. After treatment of the reaction mixture in a manner similar to that hereinbefore set forth, it is subjected to fractional distillation under reduced pressure and the desired 2-cyclononyl-p-toluidine and isomers thereof are recovered and converted to the hydrochloride salts. These salts exhibit the ability to lower the surface tension of water.

*Example XIII*

A mixture of 82 grams of aniline hydrobromide and 43 grams of 1-decene was placed in the glass liner of a rotating autoclave. The liner was sealed into the autoclave and nitrogen was pressed in until an initial pressure of 30 atmospheres was reached. The autoclave and contents thereof were then heated to a temperature of 150° C. and maintainned in a range of from about 150° to about 250° C. for a period of about 4 hours, the maximum pressure during this time reaching 70 atmospheres. At the end of this time the autoclave and contents thereof were cooled to room temperature, the final pressure being 30 atmospheres. The excess pressure was vented, the autoclave opened and the reaction product comprising 122 grams of a mixture of white solid and amber liquid was recovered. This mixture was treated with water containing a minor amount of hydrochloric acid to assure acidic conditions and thereafter extracted with ether. The ether layer was separated, shaken with potassium carbonate and subjected to fractional distillation under reduced pressure. A cut boiling at 116° C. at 0.3 mm. pressure having a refractive index $n_D^{21}$ of 1.5070 was separated and recovered, said product comprising a mixture of o- and p-sec-decylanilines.

A solution of this decylaniline fraction was prepared by adding hydrochloric acid to a mixture of 0.2 gram of the fraction and 30 cc. of water until the mixture was just acidic. The solution was then diluted to 100 cc. and thoroughly agitated to produce copious suds. This solution had a surface tension of only 27.4 dynes per cm. at 25° C.

In addition another cut from the fractional distillation under reduced pressure which boiled in a range of from 116°–125° C. at 0.4 mm. pressure having a refractive index $n_D^{21}$ of 1.5092 was recovered. This cut was insoluble in hydrochloric acid; however, when 1 drop of this cut and 1 drop of concentrated hydrochloric acid were added to 10 cc. of water, the resulting solution gave copious suds when shaken.

I claim as my invention:

1. A mineral acid salt of a cyclooctyl aromatic amine selected from the group consisting of cyclooctylphenyl amine and cyclooctylnaphthyl amine.
2. A mineral acid salt of cyclooctylaniline.
3. p-Cyclooctylaniline hydrochloride.
4. o-Cyclooctylaniline hydrochloride.
5. 2-cyclononyl-p-toluidine hydrochloride.

References Cited by the Examiner

UNITED STATES PATENTS

| | | | |
|---|---|---|---|
| 2,118,493 | 5/1938 | Coffey et al. | 260—578 |
| 2,824,895 | 2/1958 | Luvisi | 260—578 |

OTHER REFERENCES

Bachmann et al.: "Journal American Chemical Society," vol. 72, page 4915 (1950).

Hickinbottom: "Journal Chem. Soc., London," 1932, pages 2646–54.

McGuine et al.: "Journal American Chemical Soc.," vol. 69, pages 1469 (1947).

Ogawa et al.: "Chemical Abstracts," vol. 54, page 22428 (1960).

Sergievskaya et al.: "Chemical Abstracts," vol. 51, page 15478 (1957).

Sidorova et al.: "Chemical Abstracts," vol. 35, pages 3979–80 (1941).

CHARLES B. PARKER, *Primary Examiner.*

R. V. HINES, *Assistant Examiner.*